United States Patent [19]

Nelson

[11] 4,145,109
[45] Mar. 20, 1979

[54] ELECTRO-OPTIC MULTIPLEXING WITH HIGH INTERCHANNEL ISOLATION

[75] Inventor: Arthur R. Nelson, Stow, Mass.

[73] Assignee: Sperry Rand Corporation, New York, N.Y.

[21] Appl. No.: 796,103

[22] Filed: May 12, 1977

[51] Int. Cl.² .............................................. G02B 5/14
[52] U.S. Cl. .................................................. 350/96.14
[58] Field of Search ............... 350/96.14, 169, 355, 350/356

[56] References Cited

U.S. PATENT DOCUMENTS

| 3,795,433 | 3/1974 | Channin | 350/96.14 |
| 3,874,782 | 4/1975 | Schmidt | 350/96.14 |
| 3,909,108 | 9/1975 | Taylor | 350/96.14 |

OTHER PUBLICATIONS

Soref et al., "Multimode Achromatic Electro-Optic Waveguide Switch for Fiber-Optic Communications" Appl. Phys. Letts., vol. 28, No. 12, Jun. 1976.

*Primary Examiner*—John K. Corbin
*Assistant Examiner*—Stewart Levy
*Attorney, Agent, or Firm*—Howard P. Terry; Seymour Levine

[57] ABSTRACT

A method and apparatus is described for multimode electro-optic multiplexing which provides high interchannel isolation. This isolation is achieved by utilizing voltage induced optical barriers to channelize optical signals and may be increased by positioning spoiler electrodes, which are energized with the channel barrier electrode, in each channel. These spoiler electrodes establish a varying refractive index in the median which deflects optical signals from the output port of the channel, thus providing the increased isolation. The spoiler electrode concept is also employed to provide a nonguided optical multiplexer/demultiplexer.

22 Claims, 13 Drawing Figures

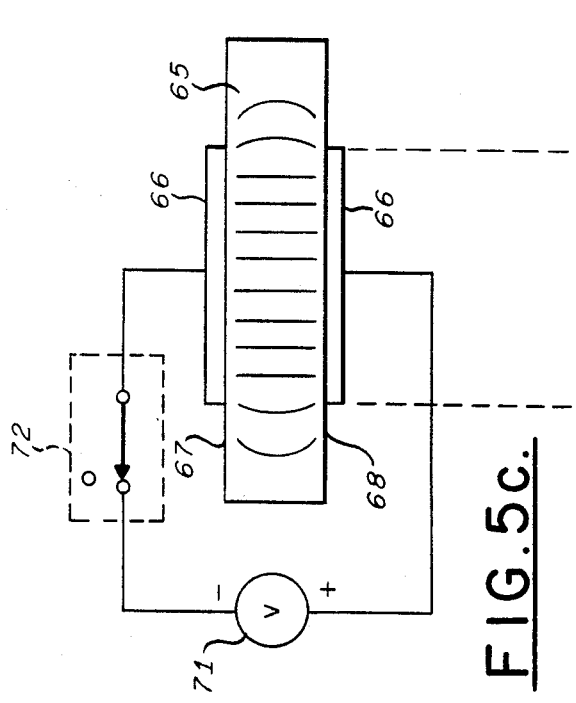
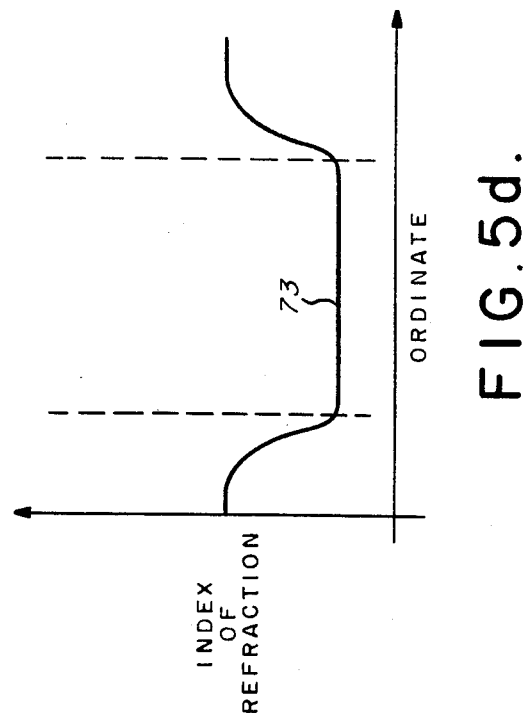
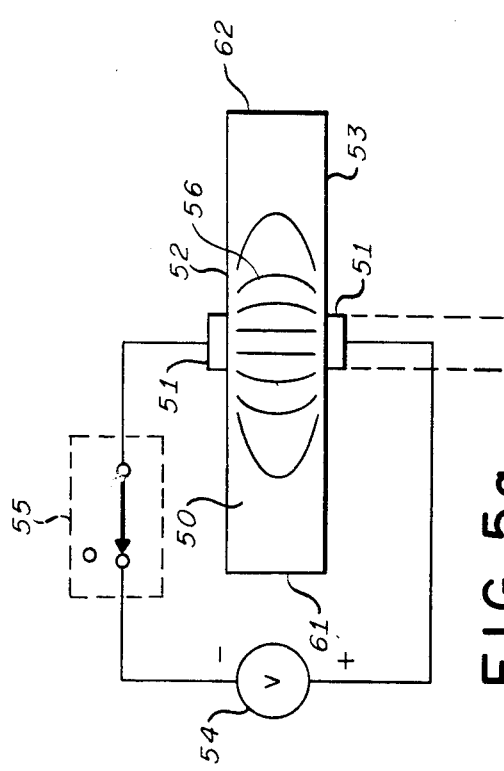
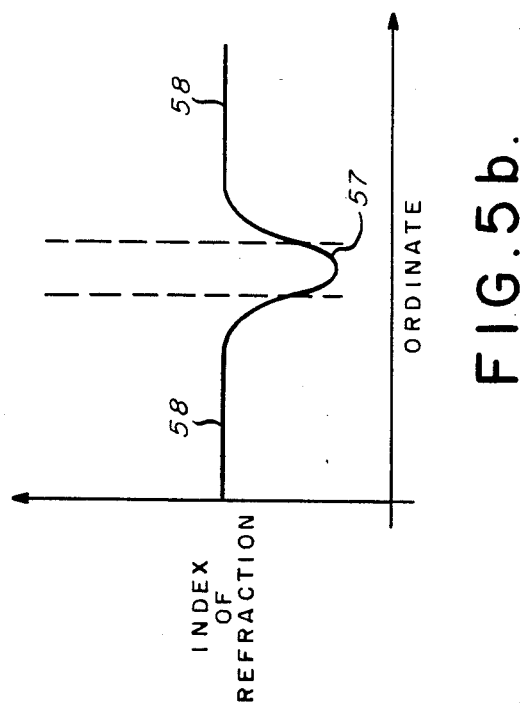

ELECTRO-OPTIC MULTIPLEXING WITH HIGH INTERCHANNEL ISOLATION

The invention herein described was made in the course of or under a contract, or subcontract thereunder, with the U.S. Army Electronics Command, Fort Monmouth, N.J.

BACKGROUND OF THE INVENTION

1. Field of the Invention

This invention relates to couplers, switches, and multiplexers for use with thin film and fiber optical waveguides.

2. Description of the Prior Art

Electro-optic materials such as $LiTaO_3$ and $LiNbO_3$, across which a voltage is applied, by means of electrodes positioned thereon, to effectuate a change in the refractive index of the material have been employed to provide optical waveguides such as those disclosed by Furukawa in U.S. Pat. No. 3,695,745 for a Light Wave Guide Circuit issued Jan. 18, 1970. This refractive index change forms an optical waveguide in the region under the excited electrode when an increase in the refractive index is effectuated or in the region between two sets of electrodes when a decrease in the refractive index is effectuated. With the proper electrode configuration and programmed voltage excitation, these materials may be utilized to provide electro-optic modulators, switches and multiplexers.

Various configurations have been employed to realize modulation switching and multiplexing devices. Among these is the combination of a multiplicity of switchable 3 dB couplers. Two switchable 3 dB couplers can be combined to form a very high isolation SPDT switch, while N such couplers may be employed to create an N:1 multiplexer or demultiplexer, and other arrangements can be created to perform as a switching matrix.

Switchable 3 dB couplers existing in the prior art, with the exception of the coupler described by Soref, et al in Applied Physics Letters, Volume 28, No. 12 on page 716, all operate with single mode radiation only such as the coupler described by Burns et al. in Applied Optics, Volume 15, on page 1053. The Soref et al. coupler provides electrodes, which are electrically decoupled by a gap therebetween, to establish a main channel and a branch channel. A voltage is applied to the main channel across the thickness of the crystal in a manner to induce a refractive index increase to form a light waveguide under the electrodes. With no voltage or reverse voltage applied to the branch electrodes, light energy theoretically does not couple to the branch channel. When a voltage is applied to the branch electrodes, the light energy propagating in the main channel is caused to divide between the two channels. However, the coupling is inefficient due to the discontinuous waveguide and a fringing electric field which does not completely fill in the gap between the main channel and the branch channel, thus producing a slight refractive index barrier to the light waves incident to the branch channel. The subject invention performs coupling, multiplexing, and switching functions with low insertion loss and high interchannel isolation.

SUMMARY OF THE INVENTION

According to the principles of the present invention, an efficient switchable 3 dB coupler employs optical barrier waveguides that are formed by the application of voltages to electrodes positioned on the top and bottom surfaces of an electro-optic crystal to decrease the refractive index in the crystal between the electrodes to form optical waveguides which are outlined by the electrodes. The electrodes are positioned to form a main optical waveguide, a branch optical waveguide and an optical gate at the intersection of the main and branch waveguides. 3 dB coupling of optical energy from the main waveguide to the branch waveguide is accomplished by removing the voltage from the gate electrode thus eliminating the barrier existing between the two waveguides. Optical energy may be switched between the two waveguides by providing a second gate electrode in the main waveguide path and alternately applying a voltage between the two gate electrodes. With additional branch waveguides and a more complex gate electrode configuration, an optical multiplexer may be formed.

Isolation between optical waveguides may be increased by inserting a spoiler electrode in various branches in front of the output ports thereof, which when energized deflect optical signals which leak through or around an energized gate. The spoiler and gate electrodes may be electrically connected to be turned on and off simultaneously. The spoiler electrode concept is also employed to provide a multiplexer/demultiplexer wherein optical signals are allowed to spread freely through the crystal from an input port at one end of the crystal to a multiplicity of output ports at the other end. A spoiler electrode is positioned in front of each output port which may be energized to deflect optical signals therefrom or to detract optical signals thereto.

Several advantages accrue to couplers, multiplexers, and switches designed in accordance with the principles of the present invention. These include a reduced insertion loss due to the elimination of reflections from metal clad interfaces, reduced photoelectric effects and minimization of field induced optical damage due to the elimination of guiding optical energy through high electric field intensity regions, which can be a major effect in $LiNbO_3$ and $Sr_xBa_{1-x}Nb_2O_6$ (SBN), and an increased interchannel signal to cross-talk ratio due to increased isolation of the optical waveguides from stray, external light sources. Additionally, the coupling barrier caused by the incomplete spreading of the fringing field, inherent in the previously mentioned Soref coupler, is essentially eliminated and consequently a more efficient coupling between main and branch waveguides is realized. Further, the electrode configuration permits the utilization of SBN which possesses an electro-optic coefficient that is from 6 to 60 times that of $LiNbO_3$ or $LiTaO_3$.

BRIEF DESCRIPTION OF THE DRAWINGS

FIGS. 5A–5D are illustrations of the variation of the index of refraction when a voltage is applied across an electro-optic material and are useful in explaining the increased isolation due to the inclusion of a spoiler electrode.

DESCRIPTION OF THE PREFERRED EMBODIMENTS

Figure 1:
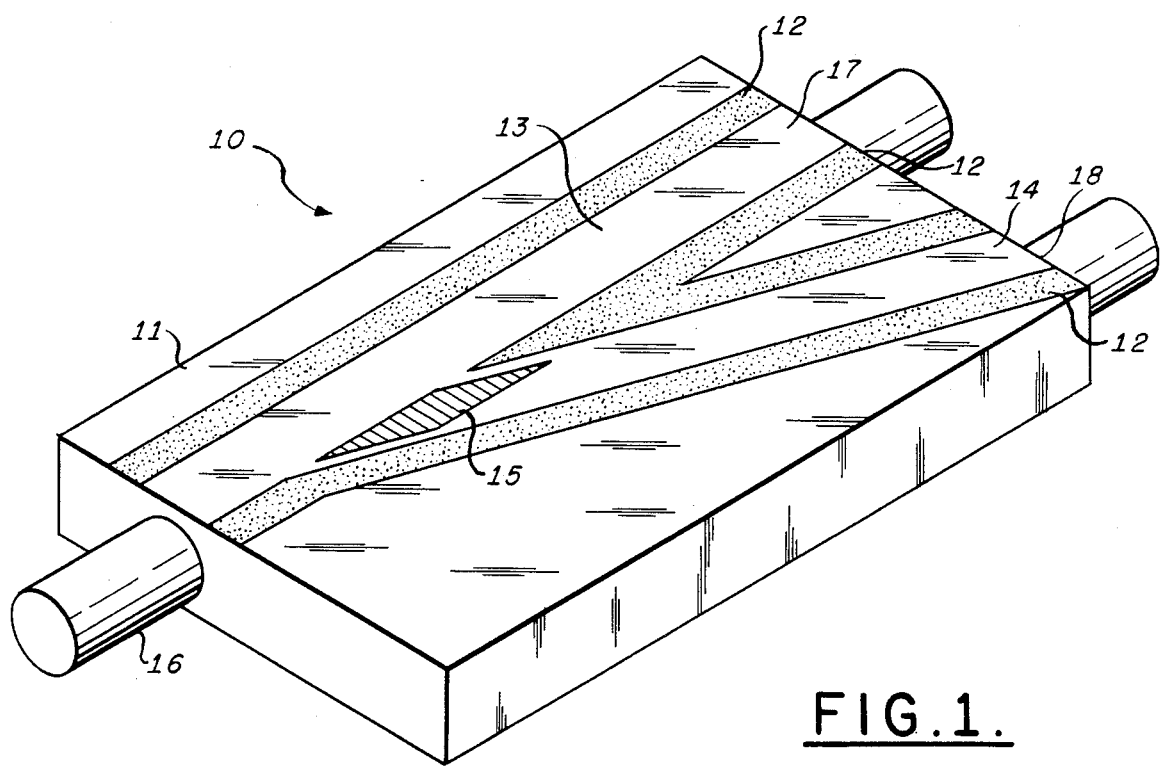
FIG. 1 is a representation of a switchable 3 dB coupler in accordance with the present invention.

Referring to FIG. 1, a multimode switchable 3 dB coupler 10 includes a thin wafer 11 which may be a z-cut $LiTaO_3$, $LiNbO_3$, or SBN on which optical waveguide forming electrodes 12 are evaporated on both sides thereof. To form a 3 dB optical waveguide coupler, a voltage is applied across the electrodes on opposite sides of the thin wafer via a voltage source (not shown) having a polarity that produces a decrease in the refractive index between the electrodes on either side of the wafer 11. This creates barriers defined by the electrode configuration which will reflect light incident thereon that has been launched in the regions between these barriers, thus establishing an optical waveguide in accordance with the electrode pattern. Formation of identical electrode patterns on the top and bottom surfaces of the crystal may present registration problems. These may be eliminated by cladding the lower surface completely with a metallic electrode and cladding the upper surface with the desired electrode pattern. In the descriptions to follow, all references to the application of voltages to electrodes will mean that the electrodes on the upper and lower surfaces are coupled between the terminals of a voltage source, thus providing a voltage across the thickness of the crystal to produce an increase or decrease in the refractive index.

The electrode pattern shown in FIG. 1, when the aforesaid voltage is applied to the electrodes 12, will establish a main waveguide 13 and a branch waveguide 14. It will be apparent to one skilled in the art that the optical waveguides 13 and 14 may also be formed by providing barriers produced with well known techniques for the reduction of the refractive index along the barrier paths. A gate electrode 15 that is electrically isolated from the electrodes 12 is positioned along the junction between the main optical waveguide 13 and the branch optical waveguide 14. When no voltage is applied between the gate electrodes 15, the refractive index at the junction between the main optical waveguide 13 and the branch optical waveguide 14 is equal to the refractive index in the propagating regions of the two optical waveguides. With the existence of this condition, an optical signal incident to the main waveguide 13 from a butt coupled optical waveguide 16, which may be an optical fiber, is free to divide between the main channel 13 and the branch channel 14. The actual percentage of the optical energy which enters the intersection depends upon the geometry of the intersection and the angular range of the incident optical signal. A 3 dB coupler may be relayed with a ±2° light cone in the crystal and 1° branch angle. For this situation the optical energy will divide equally at the junction and equal optical energy will appear at the output terminal 17 of the main optical waveguide 13 and the output terminal 18 of the branch optical waveguide 14. When a voltage of proper polarity is applied to the gate electrodes 15, the refractive index along the intersection of the main and branch optical waveguide is reduced forming an optical barrier therealong, thus isolating the branch optical waveguide 14 from the main optical waveguide 13. An optical signal now incident to the main optical waveguide 13 will propagate from the input port 16 to the output port 17 with little optical energy leakage into the branch optical waveguide 14.

Figure 2:
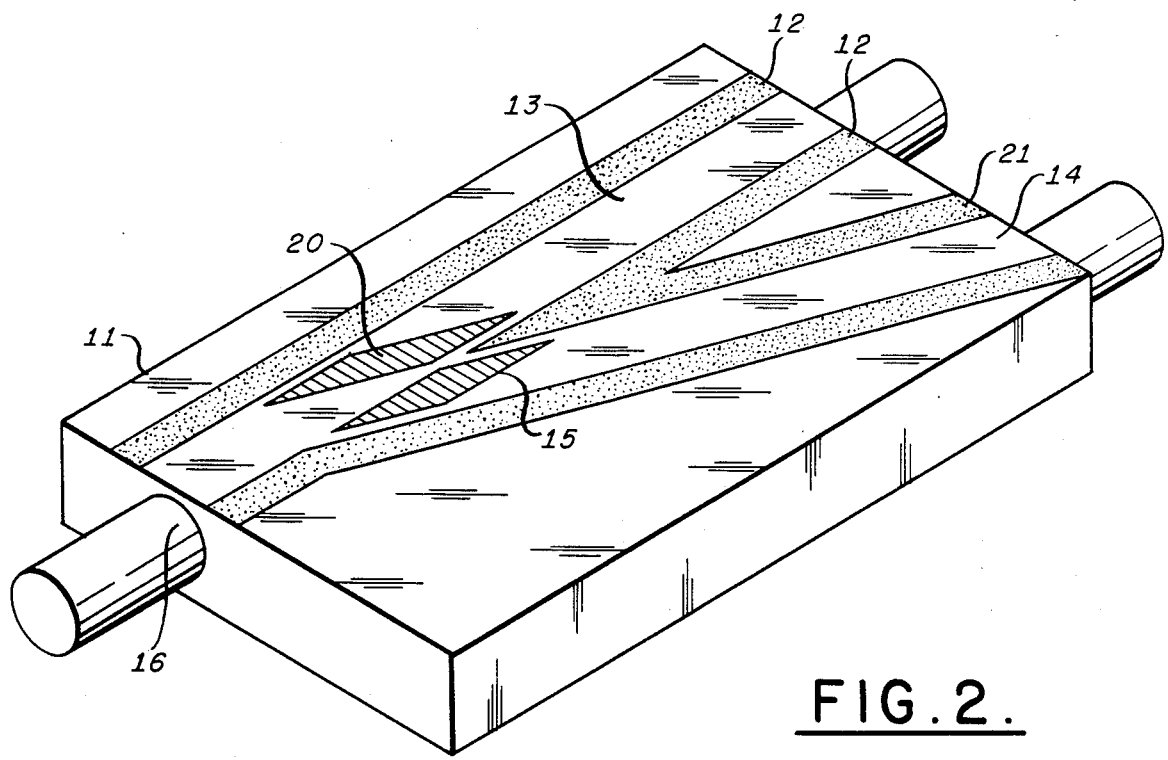
FIG. 2 is a representation of an optical waveguide switch in accordance with the present invention.

FIG. 2 illustrates an electrode pattern which will increase the coupling of optical energy from the main optical waveguide 13 to the branch optical waveguide 14 and may be utilized as an optical waveguide switch. An electrode 20 electrically isolated from the electrodes 12 and 15 is positioned in the main optical waveguide 13 in a linear relationship with the segment 21 of electrode 12 that forms one boundary of the branch optical waveguide 14. With this electrode configuration, optical signals incident to the input port 16 will be caused to substantially propagate in the branch optical waveguide 13 when no voltage is applied to the electrodes 15 and a voltage of proper polarity is applied to the electrodes 20 and in the main waveguide 13 when no voltage is applied to the electrodes 20 and a voltage of proper polarity is applied to the electrodes 15.

Figure 3:
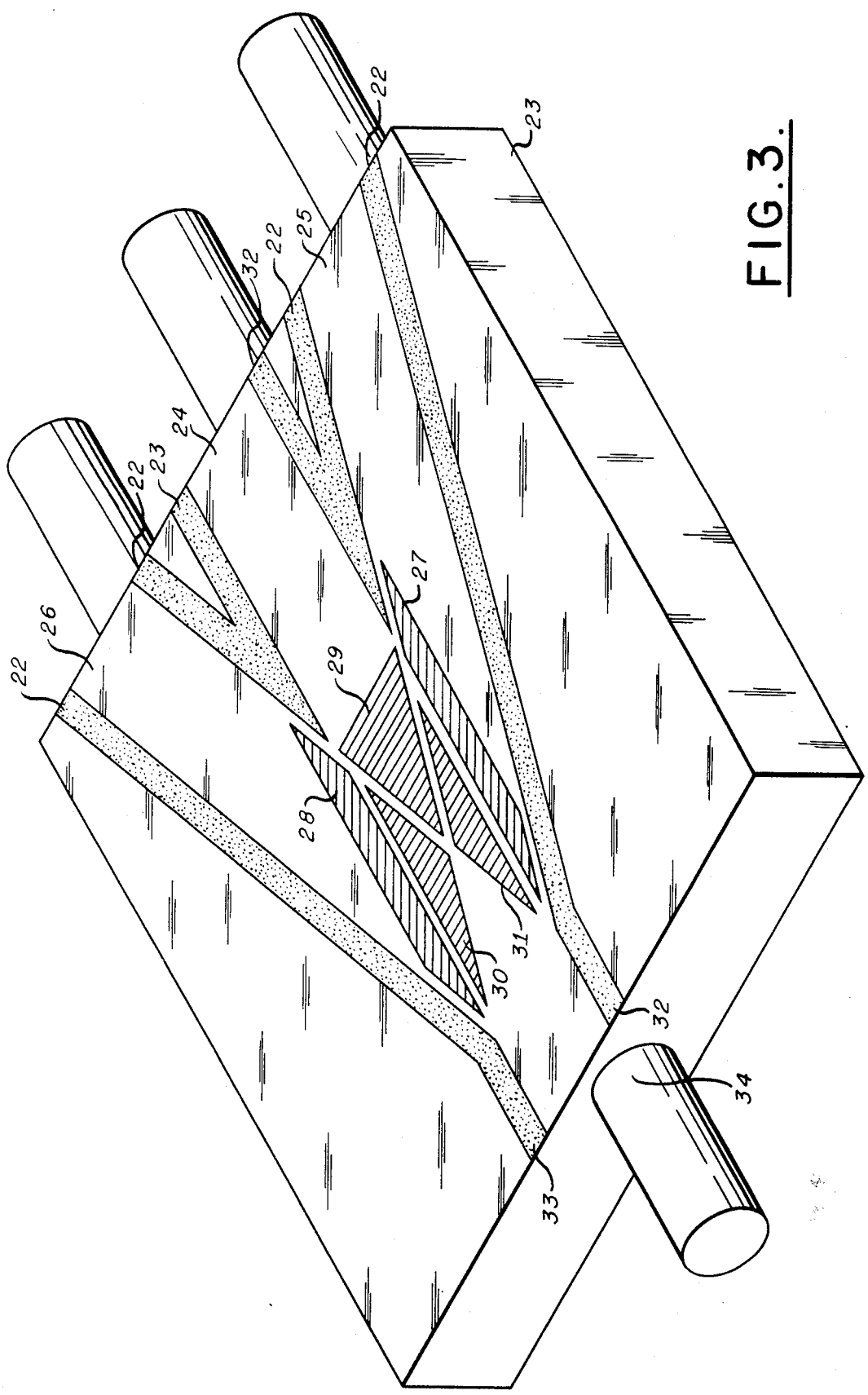
FIG. 3 is an illustration of a 2:1 multiplexer in accordance with the present invention.

In FIG. 3 is illustrated an electrode pattern for providing a 2:1 multiplexer. Electrodes 22 are positioned on both sides of a wafer 23 of electro-optical material to establish a main optical waveguide 24, a first branch optical waveguide 25, and a second branch optical waveguide 26 when voltages of proper amplitude and polarity are applied to the electrodes 22. Gate electrodes 27, 28, 29, 30 and 31, all of which are electrically isolated, are positioned in the interaction region of the main optical waveguide 24 with the branch optical waveguides 25 and 26. Electrode 27 is positioned in the intersection between the first branch optical waveguide 25 and the main optical waveguide 24 collinearly with the segments 32 of the electrodes 22 which determine one boundary of the optical waveguide 24, while electrode 28 is positioned in the intersection between the second optical waveguide branch 26 and the main optical waveguide 24 collinearly with the segments 33 of the electrodes 22 which determine the second boundary of the main optical waveguide 24. Electrodes 29, 30 and 31 are positioned in the main optical waveguide 24 and are shaped to facilitate the guiding of optical energy in the main optical waveguide 24 to either of the branch optical waveguides 25 and 26 as will be subsequently explained. When a voltage of proper amplitude and polarity is applied only to electrodes 27, optical energy incident to the multiplexer at the input port 34 will divide between the main optical waveguide 24 and the second branch optical waveguide 26. Similarly, when the voltage is applied only to the electrodes 28, the optical energy will divide between the main optical waveguide 24 and the first branch optical waveguide 25. Optical signals incident at input port 34 will propagate through the optical waveguide 24 without substantial coupling to the branch optical waveguides 25, 26 when voltages are applied to electrodes 27 and 28 and not to electrodes 29, 30 and 31. Further, substantially all optical energy is diverted to the first branch optical waveguide 25 when voltages of the proper polarity and amplitude are applied to electrodes 28, 29 and 30, while electrodes 27 and 31 are de-energized and optical energy is diverted to the second branch optical waveguide 26 when voltages are applied to electrodes 27, 29 and 31, while electrodes 28 and 30 are de-energized.

Figure 4:
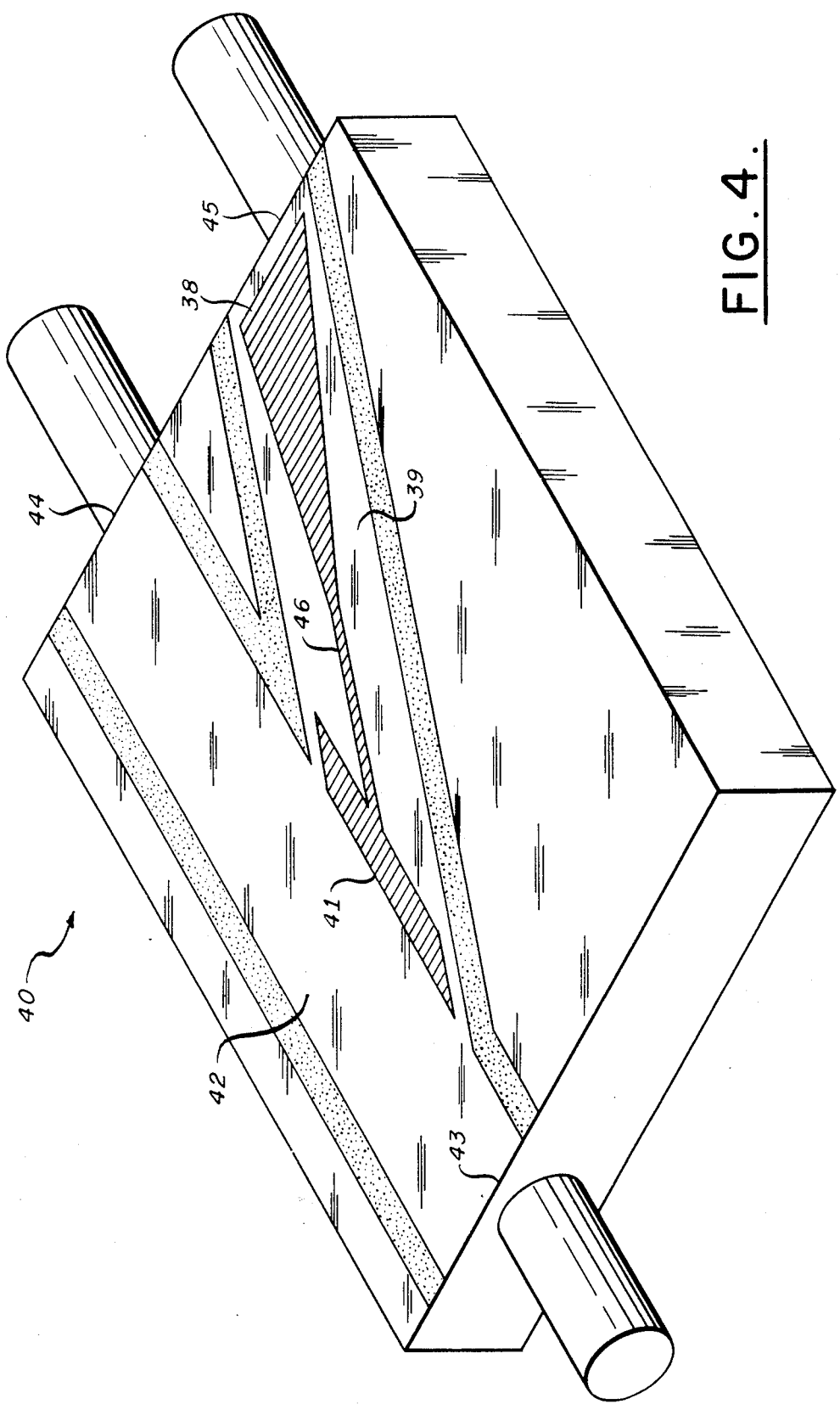
FIG. 4 is an illustration of switchable 3 dB coupler wherein a spoiler electrode is included to provide increased branch waveguide isolation.
Figure 6:
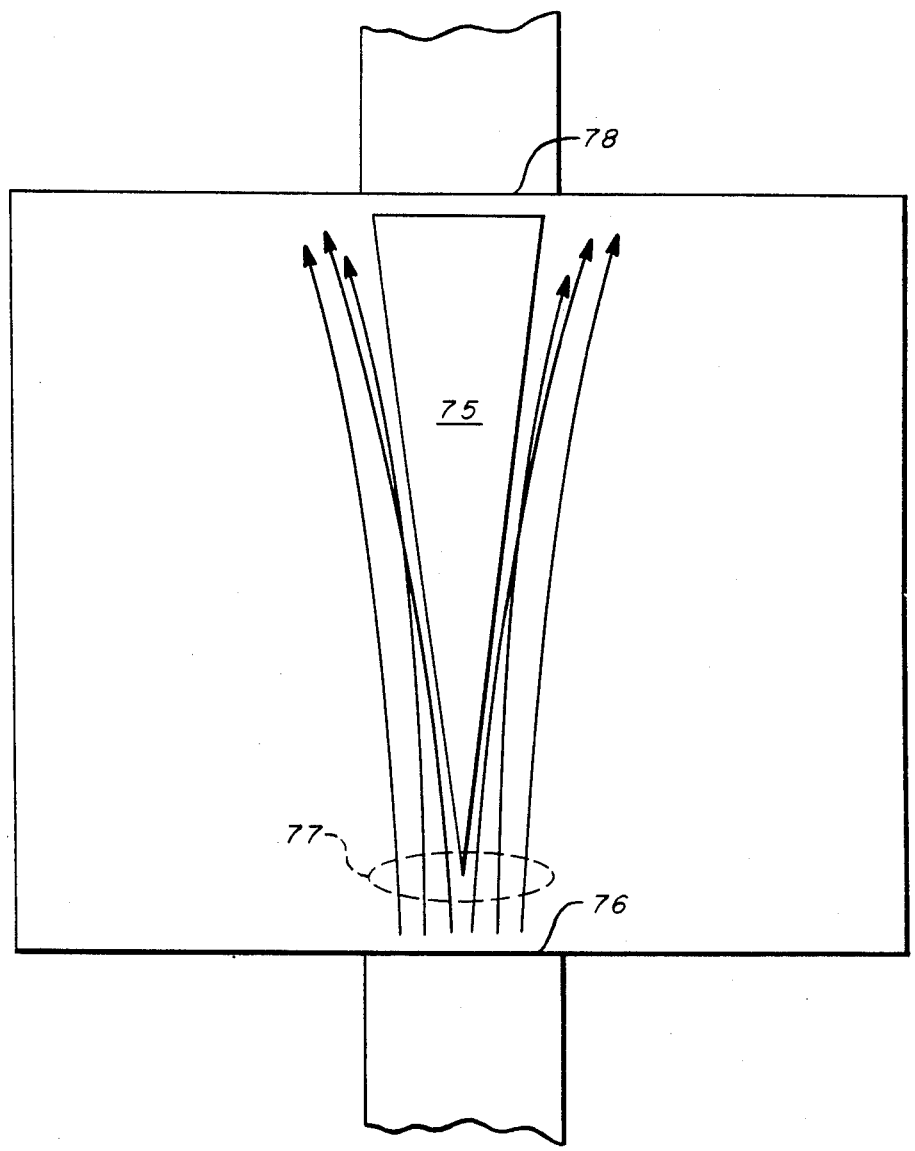
FIG. 6 is an illustration of the deflection of a light beam in the vicinity of an energized spoiler electrode.

As heretofore described, isolation between optical waveguides is effectuated by an optical barrier created in the crystal when the gate electrodes are properly energized. This isolation, however, is not complete for light may leak through and around the energized gate. Refer now to FIG. 4 wherein is shown a spoiler electrode 38 inserted in the branch optical waveguide 39 of a switchable 3 dB coupler 40 which, when properly energized, deflects optical signals from the branch waveguide output port 45. An explanation of the operation of the spoiler electrode 38 is faciliated by reference to FIGS. 5A through 5D and FIG. 6. Refer to FIG. 5A wherein a cross-sectional view of an electro-optic crystal 50 having thin electrodes 51 (i.e., the width of the electrode is less than the thickness of the crystal) positioned on the top 52 and bottom 53 surfaces thereof. The electrodes 51 are coupled to a voltage source 54 through a switch 55. When switch 55 is closed, a negative voltage V is applied across the crystal 50 causing the cross-sectional electric field 56 between the top 52 and bottom 53 surfaces of the crystal 50. In FIG. 5B is shown the refractive index profile caused by the electric field 56. The refractive index change is at a peak 57 in the area immediately between the electrodes 51 and decreases on either side thereof to the refractive index of the crystal in the absence of an applied voltage. Since light travelling in the medium with a transverse variation in refractive index is deflected towards regions of larger refractive index, the negative voltage V applied to the electrodes 51 causes the light to be diverted from the region of the electrodes towards the edges 61 and 62 of the crystal 50. Consequently, thin energized electrodes may be positioned in an optical waveguide to divert optical signals from a narrow output port. Refer now to FIG. 5C wherein is shown a cross-sectional view of an electro-optic crystal 65 having wide electrodes 66 (i.e., electrodes that are wider than the thickness of the crystal) positioned on the top 67 and bottom 68 surfaces of the crystal 65. A negative voltage may be applied across the crystal 65 by coupling the electrodes 66 to a voltage source 71 through a switch 72 to give rise to the refractive index profile shown in FIG. 5D. As shown in FIG. 5D, the refractive index distribution has a relatively broad flat region along with optical signals may propagate without being diverted to either side. Thus, to reflect optical signals from a relatively wide output port, a transition from a narrow electrode to a broad electrode is required. In FIG. 6 a triangularly shaped electrode 75 is shown which effectuates such a transition. When properly energized, the angular shaped electrode causes the transverse refractive index profile to increase from that of a narrow electrode to a broadened electrode in accordance with the increased transverse dimensions of the triangular electrode 75. This refractive index profile transition causes light rays 77, incident to the region of refractive index variation of incident angles that are less than the angle for total internal reflection to be continually deflected. In this manner, a substantial percentage of the incident light energy from input port 76 is diverted from the output port 78.

Refer again to FIG. 4. With the gate electrode 41 energized, substantially all of the optical signal incident to the main optical waveguide 42 at the input port 43 will propagate to the output port 44 while some percentage of this incident signal will leak through the gate 41 to propagate in the branch optical waveguide 39. The spoiler electrodes, when properly energized, will, however, reflect an appreciable percentage of the optical signal from the output port 45 of the branch optical waveguide 39, thus providing increased isolation between the two output ports. This isolation is at a maximum when the gate 41 and spoiler 38 electrodes are simultaneously energized. Simultaneous energization may be accomplished by connecting the gate 41 to the spoiler electrodes 38 by means of a thin spoiler electrode 46. This construction provides the additional isolation affected by the inclusion of the spoiler electrodes 38 and 46 with no additional switching voltage.

Figure 7:
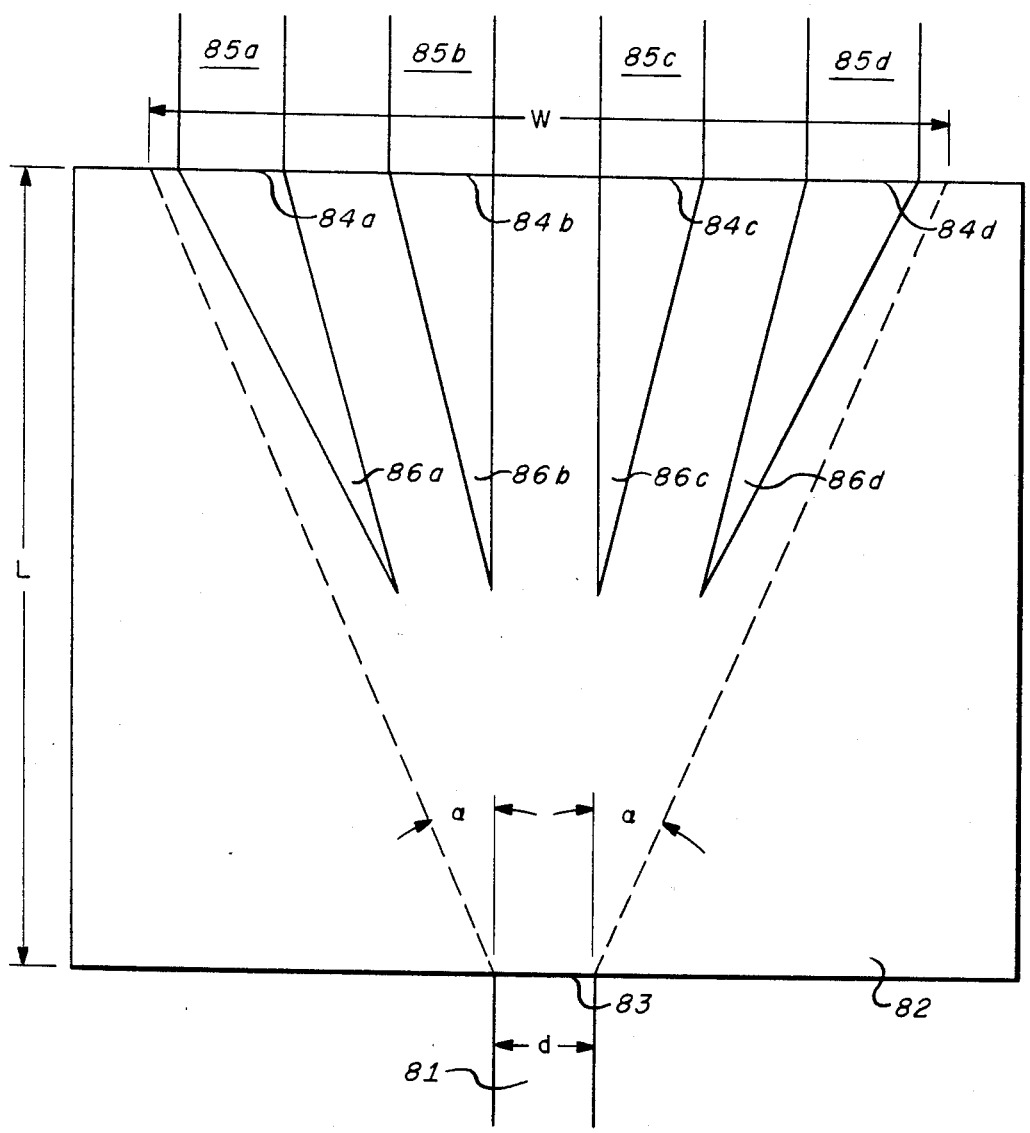
FIG. 7 illustrates a spoiler electrode configuration for a 4:1 unguided multiplexer.

FIG. 7 is an illustration of a multiplexer/demultiplexer which comprises only spoiler electrodes to provide necessary switching. In this configuration optical signals from a coupled input optical waveguide 81 is allowed to spread freely through the electro-optical crystal 82 from an input port 83. At the opposite end of the crystal, a multiplicity of output ports 84a through 84d are uniformly positioned, the number of which being limited by the angular spread 2 $\alpha$ of the input light (determined by the numerical aperture of the input optical waveguide 81), the length L of the crystal 82, which with the angular spread 2 $\alpha$ determines the illuminated width W, and the size of the optical waveguides 85a through 85d coupled respectively to the output ports 84a through 84d. Leading respectively to the output ports 84a through 84d are triangular spoilers 86a through 86d that are utilized as deflecting electrodes. Optical signals are deflected from each output port by applying a voltage of proper polarity and amplitude to the spoiler electrodes to decrease the refractive index of the electro-optic crystal 82 in the region of the energized spoiler, while a polarity reversal at an electrode increases the refractive index in the region of the electrode and provides an optical waveguide to the corresponding output port. With this configuration, demultiplexing is obtained by sequentially removing the negative voltage from each spoiler electrode or applying a positive voltage thereto to allow the optical signal to couple sequentially to output ports 84a through 84d. Since the devices are reciprocal, multiplexing is achieved by reversing the roles of the input and output ports.

The design of the spoiler multiplexer/demultiplexer of FIG. 7 is an iterative process. The width W is specified by determining the size and number of the optical waveguides 85a through 85d coupled to the output ports 84a through 84d and the desired spacing therebetween. With the size d and numerical aperture of the optical waveguide 81, which is coupled to the input port 83, specified, the spreading angle 2 $\alpha$ of the optical signal in the crystal 82 is determined and the crystal length L is calculated from L = (W−d/2) cot $\alpha$ to provide for the full illumination of the over-all width W of the output section. The maximum angular range of optical signals that can travel from the input port to the output port is then calculated. If this angular range is within the largest convenient angle that can be deflected for the polarization an electro-optic crystal employed, the design is complete. If, however, the angular range is greater than the largest convenient angle which can be deflected, then the length L of the crystal must be increased. This may be accomplished without increasing the throughput loss by decreasing the numerical aperture of the input optical waveguide by columination or some other appropriate means. This procedure is repeated until an acceptable angular range from the input to the output ports is found.

Figure 8:
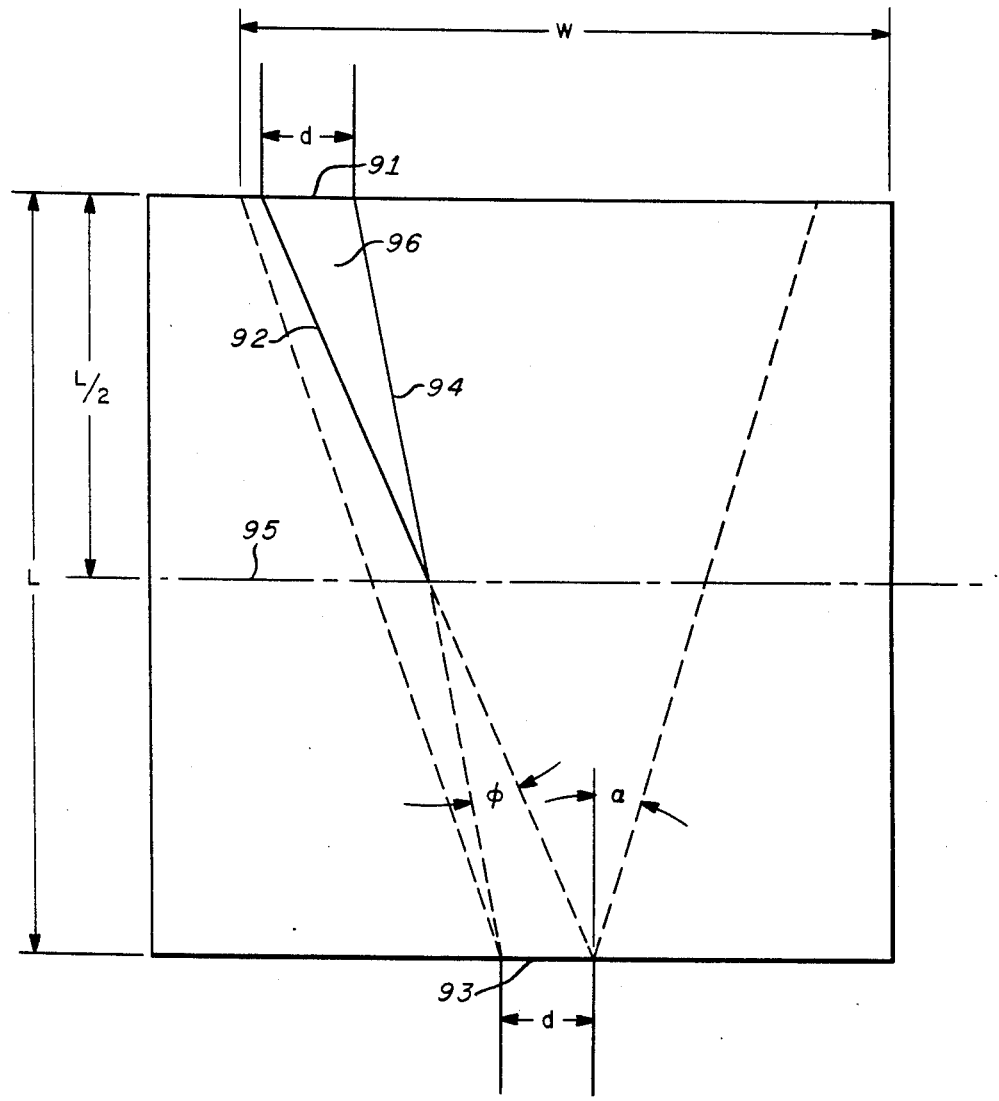
FIG. 8 is a diagram useful in explaining the method of designing the spoiler multiplexer of FIG. 7.

Optimum deflector electrode design for the spoiler multiplexer/demultiplexer of FIG. 7 may be determined with the geometrical procedure illustrated in FIG. 8. The position of the output ports at the output end of the crystal is initially determined; one of which is represented by output port 91 in FIG. 10. A straight line 92 is drawn from one edge of the output port 91 to the far edge of the input port 93. Another straight line 94 is drawn from the other edge of the output port 91 to the other edge of the input port 93. These lines intersect approximately on the center line 95 of the crystal and form an angle $\phi$ thereat. The angle $\phi$ is representative of the maximum angular range that the light rays may travel from the input port 93 to the output port 91. This angle $\phi$ is determined for all spoilers from the approximate formula:

$$\tan \phi \approx 2W/L$$

and provides the initial estimate of the apex angle of the triangular deflector electrode 96.

Figure 9:
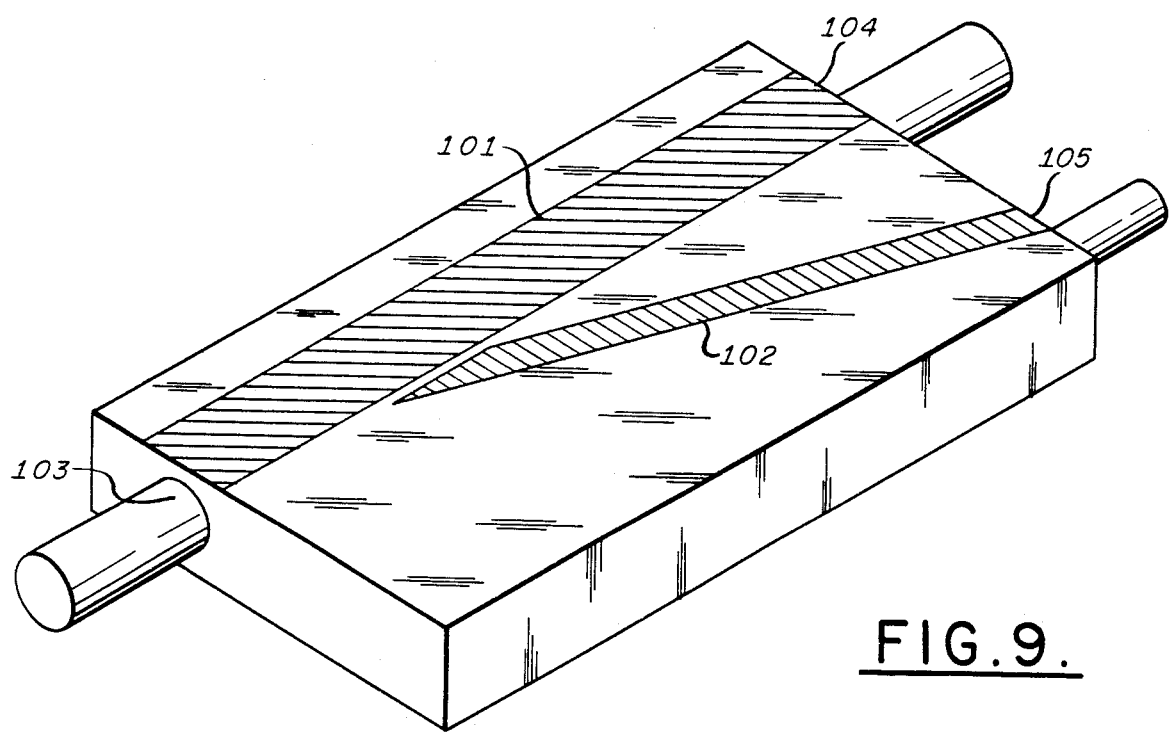
FIGS. 9 and 10 illustrate the utilization of a spoiler electrode to improve the branch waveguide isolation for a gap type coupler.

When a voltage of positive polarity is applied across the lower and upper surfaces of an electro-optic crystal, the refractive index change is positive causing the refractive index of the crystal in the region between the electrodes, to which the voltage source is coupled, to be greater than the refractive index of the remainder of the crystal. For this configuration an optical signal having a divergence angle within the range defined by the refractive index between the electrodes and the refractive index of the remainder of the crystal will propagate in the region between the electrodes with substantially no leakage to the remaining sections of the crystal. Refer now to FIG. 9 wherein a switchable coupler of the type described by Soref is shown. When a positive voltage is applied to the electrodes 101 of the main optical waveguide and no voltage is applied to the electrodes 102 of the branch optical waveguide, substantially all optical energy incident to the main optical waveguide at input port 103 propagates to the main optical waveguide output port 104. When a positive voltage is also applied to the electrodes 102 of the branch optical waveguide, some portion of the optical energy in the main optical waveguide is coupled through branch optical waveguide to the output port 105. When the electrodes 102 are thin (i.e., the width of the electrodes is less than the thickness of the crystal), additional isolation may be achieved for the off condition of the branch optical waveguide by applying a voltage to the electrodes 102 that provides a negative voltage across the crystal in the region defining the branch optical waveguide. This negative voltage, as previously explained, deflects optical signals, leaked from the main optical waveguide, from the output port 105 of the branch optical waveguide.

Figure 10:
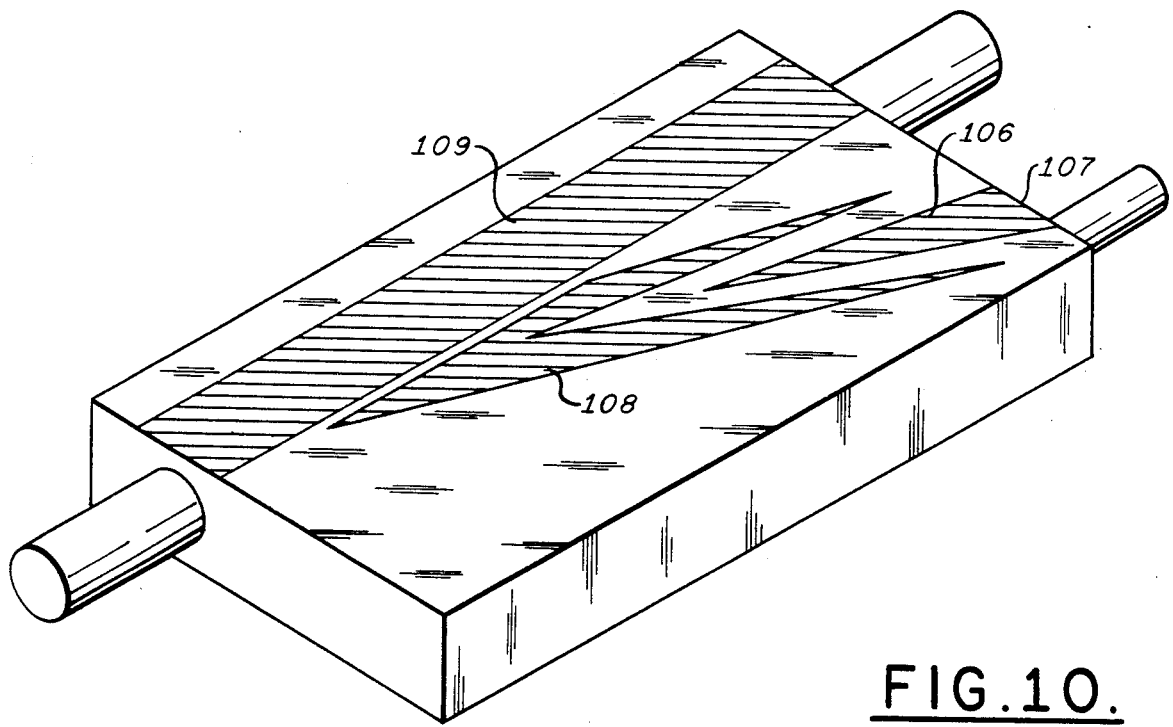

FIG. 10 illustrates an electrode configuration to provide increased isolation for a switchable coupler comprised of under electrode optical waveguides wherein the branch optical waveguide and output port are wide relative to the thickness of the crystal. As shown in FIG. 10, the branch electrode is divided into two sections, a triangular section 106 which extends from the output port 107 into the interior of the branch electrode and a coupling section 108 of the branch electrode which is electrically isolated from the triangular section 106 and configured to mate therewith to form the completed branch electrode. When a positive voltage is applied to electrode 109 and the branch optical waveguide is in the off condition, the electrode 106 is not energized, and a negative voltage is applied to the electrode 106. Thus, optical signals leaked from the main optical waveguide into the coupling region propagate towards the spoiler electrode 106 and are deflected from the output port 107 of the branch optical waveguide. An alternate configuration of this type switchable 3 dB coupler electrically couples the electrode 109 of the main optical waveguide to the coupling electrode 108 of the branch optical waveguide. The device provides optical coupling of signals, propagating in the main optical waveguide to the output port 107 of the branch optical waveguide when a positive voltage is applied to the electrode 106 and provides isolation of the output port 107 of the branch optical waveguide when a negative voltage is applied to the electrode 107.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. A switchable optical coupling apparatus comprising:
   a wafer of electro-optic material;
   means for creating optical walls in said wafer which establish a region for a main optical waveguide, a region for a branch optical waveguide, and a coupling region therebetween;
   a first electrode pattern formed on one major surface of said wafer including a gate electrode electrically isolated from other electrodes in said pattern and positioned therein to be within the outlines of said coupling region;
   a second electrode pattern, formed on an opposing surface of said wafer, substantially identical to and substantially in registration with said first electrode pattern; and
   means for applying a gate voltage across said wafer through said gate electrodes of said first and second electrode patterns, the application of said voltage causing a change in the refractive index in the portion of said wafer lying between said gate electrodes whereby a barrier wall is formed in said coupling region to provide a substantially continuous main optical waveguide through said wafer.

2. A switchable optical coupling apparatus in accordance with claim 1 wherein said first and second electrode patterns include a deflecting electrode that is electrically isolated from other electrodes and positioned in said electrode pattern to be within the outlines of said branch optical waveguide region and further including means for applying a voltage across said wafer through said deflecting electrode, the application of said voltage causing a change in the refractive index in the region of said wafer lying between said deflecting electrodes whereby optical signals propagating in said branch optical waveguide are deflected from said branch optical waveguide.

3. The switchable optical coupling apparatus of claim 2 wherein said deflecting electrodes in said first and second electrode patterns are electrically connected to said gate electrodes in said first and second electrode patterns respectively.

4. A switchable optical coupling apparatus in accordance with claim 1 further including:
a second gate electrode in said first and second electrode patterns electrically isolated from other electrodes in said patterns and positioned in said electrode pattern so that a projection thereof in said wafer is substantially collinear with one optical wall of said branch optical waveguide;
means for applying a voltage across said wafer through said second gate electrodes, the application of said voltage causing a change in the refractive index in the portion of said wafer lying between said second gate electrodes whereby a barrier wall is formed in said main optical waveguide which deflects optical signals propagating in said main optical waveguide to said branch optical waveguide.

5. A switchable optical coupling apparatus in accordance with claim 4 wherein said first and second electrode patterns include deflecting electrodes isolated from other electrodes and positioned in said electrode patterns to be within the outline of said branch optical waveguide region and further including means for applying a voltage across said wafer through said deflecting electrodes, the application of said voltage causing a change in the refractive index in the region of said wafer lying between said deflecting electrodes whereby optical signals propragating in said branch optical waveguide are deflected therefrom.

6. The switchable optical coupling device of claim 5 wherein said first and second electrode patterns include a second deflecting electrode isolated from other electrodes and positioned to be within the outlines of said main optical waveguide region and further including means for applying a voltage across said wafer through said second deflecting electrodes, the application of said voltage causing a change in the refractive index in the region of said wafer lying between said deflecting electrodes whereby optical signals propagating in said main optical waveguide are deflected therefrom.

7. The switchable optical coupling apparatus of claim 6 wherein said second deflecting electrodes in said first and second electrode patterns are electrically connected to said second gate electrodes in said first and second electrode patterns respectively and said deflecting electrodes in said first and second electrode patterns are electrically connected to said gate electrodes in said first and second electrode patterns respectively.

8. A switchable optical coupling apparatus in accordance with claim 1 further including means for creating optical walls in said wafer which outline a second branch optical waveguide with a second coupling region located between said second branch optical waveguide and said main optical waveguide, and wherein said first and second electrode patterns include a second gate electrode electrically isolated from other electrodes and positioned to be within the outlines of said second coupling region, and a multiplicity of electrically isolated electrodes positioned to be within the outlines of said main optical waveguide so that projections thereof in said wafer have edges in collinear relation with one optical wall of said branch optical waveguide and one optical wall of said second branch optical waveguide; and further including means for applying voltages across said wafer through said second gate electrode and said multiplicity of electrically isolated electrodes, the application of said voltages causing a change in the refractive index of said wafer lying between the electrodes through which said voltages are applied whereby an optical signal incident to said main optical waveguide is guided to said branch optical waveguide when voltages are applied through said second gate electrodes and to predetermined electrodes of said multiplicity of electrodes, said optical signal is guided to said second branch optical waveguide when voltages are applied through said gate electrode and to preselected electrodes of said multiplicity of electrodes, and said optical signal is guided through said main optical waveguide when voltages are applied through said gate electrode and said second gate electrode.

9. A switchable optical coupling apparatus in accordance with claim 8 wherein said first and second electrode patterns include a deflecting electrode, electrically isolated from other electrodes, positioned in said electrode pattern to be within the outlines of said branch optical waveguide region and a second deflecting electrode, electrically isolated from other electrodes, positioned in said electrode pattern to be within the outlines of said second branch optical waveguide and further including means for applying voltages across said wafer through said deflecting and second deflecting electrodes, the application of said voltages to said deflecting and second deflecting electrodes causing a change in the refractive index in the region of said wafer lying between said deflecting and second deflecting electrodes to which a voltage is applied whereby optical signals propagating in said branch optical waveguide are deflected therefrom when a voltage is applied through said deflecting electrodes and optical signals propagating in said second branch optical waveguide are deflected therefrom when a voltage is applied through said second deflecting electrodes.

10. A switchable optical coupling apparatus in accordance with claim 1 wherein said second electrode pattern is a continuous electrode sheet substantially covering the entire area of said opposing surface with said voltages applied through said first electrode pattern and said electrode sheet.

11. A switchable optical coupling apparatus in accordance with claim 10 wherein said first electrode pattern includes a deflecting electrode that is electrically isolated from other electrodes and positioned in said first electrode pattern to be within the outlines of said branch optical waveguide region and further including means for applying a voltage across said wafer through said deflecting electrode, the application of said voltage causing a change in the refractive index of said wafer in the region of said deflecting electrode whereby optical signals propagating in said branch optical waveguide are deflected therefrom.

12. The switchable optical coupling apparatus of claim 11 wherein said deflecting electrode in said first electrode pattern is electrically connected to said gate electrode.

13. A switchable optical coupling apparatus in accordance with claim 10 further including:
a second gate electrode in said first electrode pattern electrically isolated from other electrodes in said pattern, positioned to be within the outlines of said main optical waveguide so that a projection thereof in said wafer is substantially collinear with one optical wall of said branch optical waveguide;
means for applying a voltage across said wafer through said second gate electrode and said electrode sheet, the application of said voltage causing a change in the refractive index of said wafer in the region of said second gate electrode whereby a barrier wall is formed in said main optical waveguide which deflects optical signals propagating in said main optical waveguide to said branch optical waveguide.

14. A switchable optical coupling apparatus in accordance with claim 13 wherein said first electrode pattern includes a deflecting electrode isolated from other electrodes and positioned to be within the outlines of said branch optical waveguide region and further including means for applying a voltage across said wafer through said deflecting electrode and said sheet electrode, the application of said voltage causing a change in the refractive index in the region of said wafer lying between said deflecting electrode and said sheet electrode whereby optical signals propagating in said branch optical waveguide are deflected therefrom.

15. The switchable optical coupling device of claim 14 wherein said first electrode pattern includes a second deflecting electrode isolated from other electrodes and positioned to be within the outlines of said main optical waveguide region and further including means for applying a voltage across said wafer through said deflecting electrode and said sheet electrode, the application of said voltage causing a change in the refractive index in the region of said wafer lying between said deflecting electrode and said sheet electrode whereby optical signals propagating in said main optical waveguide are deflected therefrom.

16. The switchable optical coupling apparatus of claim 15 wherein said second deflecting electrodes are electrically connected to said second gate electrodes and said deflecting electrodes are electrically connected to said gate electrodes.

17. A switchable optical coupling apparatus in accordance with claim 10 further including means for creating optical walls in said wafer which outline a second branch optical waveguide with a second coupling region located between said second branch optical waveguide and said main optical waveguide, and wherein said first electrode pattern includes a second gate electrode electrically isolated from other electrodes in said electrode pattern, and positioned to be within the outlines of said second coupling region, and a multiplicity of electrically isolated electrodes positioned to be within the outlines of said main optical waveguide so that projections thereof in said wafer have edges in collinear relation with one optical wall of said branch optical waveguide and one optical wall of said second branch optical waveguide; further including means for applying voltages across said wafer through said second gate electrode and said sheet electrode and through said multiplicity of electrically isolated electrodes and said sheet electrode, the application of said voltages causing a change in the refractive index of said wafer lying between the electrodes through which said voltages are applied and said sheet electrode whereby an optical signal incident to said main optical waveguide is guided to said branch optical waveguide when voltages are applied through said second gate electrodes and to predetermined electrodes of said multiplicity of electrodes, said optical signal is guided to said second branch optical waveguide when voltages are applied through said gate electrode and to preselected electrodes of said multiplicity of electrodes, and said optical signal is guided through said main optical waveguide when voltages are applied through said gate electrode and said second gate electrode.

18. A switchable optical coupling apparatus in accordance with claim 17 wherein said first electrode pattern includes a deflecting electrode, electrically isolated from other electrodes, positioned to be within the outlines of said branch optical waveguide region and a second deflecting electrode, electrically isolated from other electrodes, positioned to be within the outlines of said second branch optical waveguide and further including means for applying voltages across said wafer through said deflecting and second deflecting electrode, the application of said voltages causing a change in the refractive index in the region of said wafer lying between said deflecting and second deflecting electrodes to which a voltage is applied whereby optical signals propagating in said branch optical waveguide are deflected therefrom when a voltage is applied through said deflecting electrode and optical signals propagating in said second branch optical waveguide are deflected therefrom when a voltage is applied through said second deflecting electrode.

19. A switchable optical coupling apparatus comprising:
   a wafer of electro-optic material having a first port at one edge thereof and a multiplicity of second ports at an edge opposite said one edge;
   a first electrode pattern formed on one major surface of said wafer including a multiplicity of triangular shaped electrodes having bases adjacent said second ports at said edge of said electro-optic material opposite said one edge, each base corresponding to one of said second ports, and forming an apex in the direction of said first port;
   a second electrode pattern formed on an opposing surface of said wafer, substantially identical to and substantially in registration with said first electrode pattern; and
   means for applying voltages across said wafer through said triangular electrodes of said first and second electrode patterns, whereby voltages of a predetermined polarity applied across said wafer through one triangular shaped electrode of said first electrode pattern and its corresponding electrode of said second electrode pattern creating an optical path between said first port and said one of said second ports corresponding to said base of said triangular shaped electrode to which said voltage is applied, and a voltage of polarity opposite to said predetermined polarity applied across said wafer through said triangular shaped electrodes causing optical decoupling between said first port and said one of said second ports.

20. The switchable optical coupling apparatus of claim 19 in which said second electrode pattern covers substantially the entire area of said opposing surface of said wafer.

21. A switchable optical coupling apparatus comprising:
   a wafer of electro-optic material;
   a first electrode pattern formed on one major surface of said wafer including a first electrode substantially traversing said wafer from one edge to an opposite edge and a second electrode which includes a first section, extending obliquely from said first electrode, having a triangular notch extending from a base facing said opposite edge to an apex pointing towards said first electrode and second section, electrically isolated from said first section, providing a triangular electrode for insertion into said triangular notch;

a second electrode pattern formed on an opposing surface of said wafer, substantially identical to and substantially in registration with said first electrode pattern;

means for applying a voltage, of a predetermined polarity, across said wafer through said first electrodes, the application of said voltage causing a change in the refractive index of the portion of said wafer lying between said first electrodes for forming a light waveguide path in said wafer conforming in size and shape to said first electrode;

means for applying a voltage of said predetermined polarity and of polarity opposite said predetermined polarity across said wafer through said first and second sections of said second electrodes, the simultaneous application of said voltage with said predetermined polarity to said first and second sections causing a change in the refractive index of the portion of said wafer lying between said second electrodes forming a light waveguide path in said wafer conforming in size and shape to said second electrode and the application of said voltage with said polarity opposite said predetermined polarity to said second section of said second electrodes causing a change in the refractive index of said portion of said wafer between said second section of said second electrodes that causes light to be deflected from said light waveguide path of said second electrodes.

22. The switchable optical coupling apparatus of claim 21 in which said second electrode pattern covers substantially the entire area of said opposing surface of said wafer.

* * * * *